(12) United States Patent
Weng et al.

(10) Patent No.: US 12,399,400 B2
(45) Date of Patent: Aug. 26, 2025

(54) OPTICAL FILM INCLUDING MICROSTRUCTURE LAYER AND DISPLAY DEVICE INCLUDING THE SAME

(71) Applicant: Coretronic Corporation, Hsin-Chu (TW)

(72) Inventors: Chao-Hung Weng, Hsin-Chu (TW); Hung-Tse Lin, Hsin-Chu (TW); Ching-Nan Chuang, Hsin-Chu (TW); Hao-Jan Kuo, Hsin-Chu (TW); Ming-Dah Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/770,639

(22) Filed: Jul. 11, 2024

(65) Prior Publication Data

US 2025/0035834 A1  Jan. 30, 2025

(30) Foreign Application Priority Data

Jul. 25, 2023  (CN) .......................... 202310915079.X (51) Int. Cl.
*G02F 1/1335* (2006.01)
*F21V 8/00* (2006.01)
*G02F 1/13357* (2006.01)

(52) U.S. Cl.
CPC ..... *G02F 1/133616* (2021.01); *G02B 6/0016* (2013.01); *G02B 6/0053* (2013.01);
(Continued)

(58) Field of Classification Search
CPC ................ G02B 6/0053; G02B 6/0061; G02F 1/133606; G02F 1/133607; G02F 1/133616
See application file for complete search history.

(56) References Cited

U.S. PATENT DOCUMENTS 11,966,119 B2 *  4/2024  Jang ................. G02F 1/133711
2002/0130986 A1 *  9/2002  Richard ............... G02B 6/0053
349/62

(Continued)

FOREIGN PATENT DOCUMENTS

CN  101598865  12/2009
CN  109031512  12/2018
(Continued)

*Primary Examiner* — Keith G. Delahoussaye
(74) *Attorney, Agent, or Firm* — JCIPRNET (57) ABSTRACT

A display device including a display module and an illuminating module is disclosed. The illuminating module is disposed on a display surface of the display module, and includes a light source, a light guide plate, and an optical film. The optical film is disposed between the display module and the light guide plate, and includes a basal layer and a microstructure layer. The microstructure layer is disposed between a surface of the basal layer and the light guide plate, and includes multiple microstructures. Each microstructure includes a first surface and a second surface. A first angle is between the first surface and a datum plane. A second angle is between the second surface and the datum plane. The first angle and the second angle are greater than or equal to 40 degrees and less than or equal to 90 degrees.

14 Claims, 6 Drawing Sheets

(52) U.S. Cl.
CPC ...... *G02B 6/0065* (2013.01); *G02F 1/133606* (2013.01); *G02F 1/133607* (2021.01); *G02F 1/133611* (2013.01)

(56) References Cited

U.S. PATENT DOCUMENTS

| | | | | |
|---|---|---|---|---|
| 2007/0035680 | A1* | 2/2007 | Watanuki | G02B 6/0061 349/61 |
| 2009/0180276 | A1* | 7/2009 | Benitez | G02B 6/0053 362/97.4 |
| 2010/0086743 | A1* | 4/2010 | Wang | G02B 5/0242 428/172 |
| 2015/0029744 | A1* | 1/2015 | Van Ostrand | G02B 6/0038 362/346 |
| 2020/0073044 | A1* | 3/2020 | Wang | G02B 6/0055 |

FOREIGN PATENT DOCUMENTS

| | | |
|---|---|---|
| CN | 112764136 | 5/2021 |
| TW | M304683 | 1/2007 |
| TW | 202243874 | 11/2022 |

\* cited by examiner

OPTICAL FILM INCLUDING MICROSTRUCTURE LAYER AND DISPLAY DEVICE INCLUDING THE SAME

CROSS-REFERENCE TO RELATED APPLICATION

This application claims the priority benefit of China application serial no. 202310915079.X, filed on Jul. 25, 2023. The entirety of the above-mentioned patent application is hereby incorporated by reference herein and made a part of this specification.

BACKGROUND

Technical Field

This disclosure relates to an optical film and a display device.

Description of Related Art

In a front light display device, a light source and a light guide plate are usually disposed on one side of the display surface of the display module, and patterns are disposed on the lower surface of the light guide plate. After the light emitted from the light source enters the light guide plate, it is first reflected and/or scattered by the patterns and then reaches the display surface of the display module, and is then reflected by the display surface and enters the eyes of the user, so that the image of the front light display device can be visualized. On the other hand, the light guide plate and the display module need to be bonded by an adhesive, and if the aforesaid bonding is carried out by means of a full-surface bonding, the adhesive will contact the patterns of the light guide plate, which will result in a decrease in the reflection/scattering ability of the patterns to light. If the above bonding is done via means of a frame bonding, the reliability of the display device might be reduced.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

In order to achieve one, part or all of the above purposes or other purposes, according to an embodiment of the disclosure, an optical film is provided, including a basal layer and a microstructure layer. The microstructure layer is disposed on a surface of the basal layer, and the microstructure layer includes multiple microstructures, where each of the microstructures includes a first surface and a second surface disposed opposite to each other. A first angle is between the first surface and a datum plane, a second angle is between the second surface and the datum plane, the datum plane is parallel to the surface of the basal layer, and the first angle and the second angle are greater than or equal to 40 degrees and less than or equal to 90 degrees.

According to an embodiment of the disclosure, a display device is provided, including a display module and an illuminating module. The display module has a display surface. The illuminating module is disposed on the display surface of the display module and includes a light source, a light guide plate, and an optical film. The light source is disposed on a first side of the light guide plate. The optical film is disposed between the display module and the light guide plate, and includes a basal layer and a microstructure layer. The microstructure layer is disposed between a surface of the basal layer and the light guide plate, and includes multiple microstructures, where each of the microstructures includes a first surface and a second surface disposed opposite to each other. A first angle is between the first surface and a datum plane, a second angle is between the second surface and the datum plane, the datum plane is parallel to the surface of the basal layer, and the first angle and the second angle are greater than or equal to 40 degrees and less than or equal to 90 degrees.

Based on the above, the optical film provided by the embodiment of the disclosure has microstructures. Each of the microstructures has the first surface and the second surface. The first angle is between the first surface and the datum plane, and the second angle is between the second surface and the datum plane. When the display surface of the display module of the display device is parallel to the datum plane, and the illuminating module of the display device is equipped with the light source on the side of the light guide plate, light emitted from the light source is firstly reflected by the first surface and/or the second surface and reach the display surface of the display module, and then is reflected by the display surface and enter into eyes of a user, so as to make a display image of the display device visible. Compare with the conventional way, where patterns are disposed on a lower surface of the light guide plate for reflecting light. According to the embodiments of the disclosure, the microstructures are disposed in the optical film, and the light guide plate, the optical film, and the display module may be laminated in a full-surface manner, making the display device more reliable.

To make the aforementioned more comprehensible, several embodiments accompanied with drawings are described in detail as follows.

Other objectives, features and advantages of the disclosure will be further understood from the further technological features disclosed by the embodiments of the disclosure where there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The aforementioned and other technical contents, features and functions of the disclosure will be clearly presented in the following detailed description of a preferred embodiment with reference to the drawings. Directional terms mentioned in the following embodiments, such as up, down, left, right, front or back, are only for reference to the directions in the attached drawings. Therefore, the directional language used is to illustrate and not to limit the disclosure.

Figure 1:
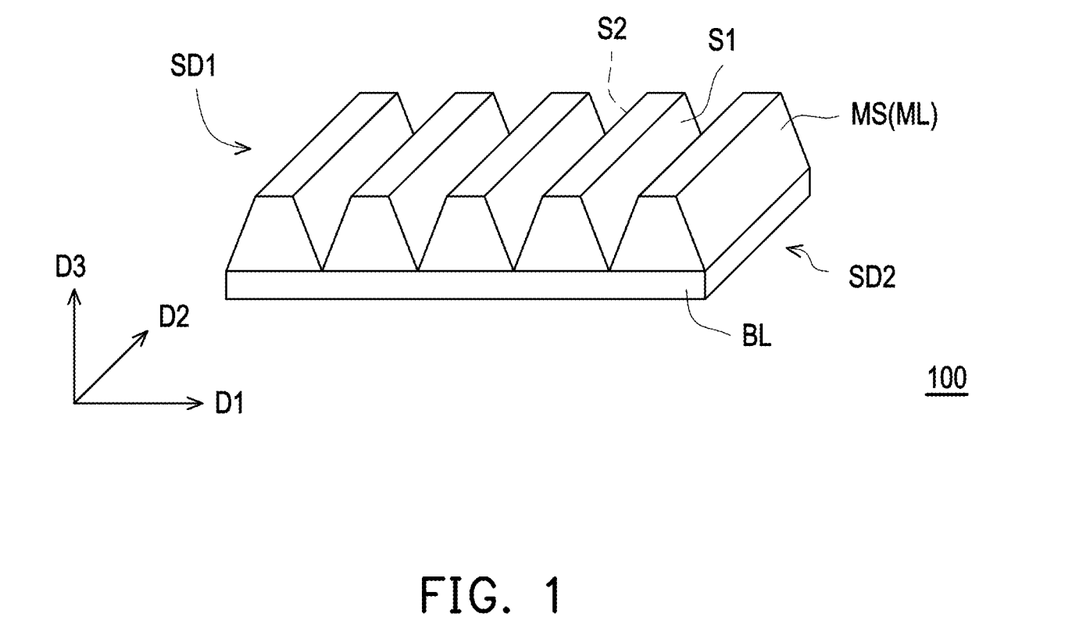
FIG. 1 is a schematic diagram of the optical film according to the first embodiment of the disclosure.

FIG. 1 is a schematic diagram of an optical film according to the first embodiment of the disclosure. Referring to FIG. 1, an optical film 100 includes a basal layer BL and a microstructure layer ML. The microstructure layer ML is disposed on a surface of the basal layer BL, and the microstructure layer ML includes multiple microstructures MS. Each of the microstructures MS includes a first surface S1 and a second surface S2 disposed opposite to each other. In this embodiment, each of the microstructures MS is in the form of a strip, and the microstructures MS are sequentially arranged from a side SD1 toward another side SD2 of the optical film 100 along a direction D1, and the strip structures extend in a direction D2. A height of the microstructure layer ML falls in a range of 5 microns to 100 microns in a direction D3, wherein the direction D3 is parallel to the normal direction of the basal layer BL, and is perpendicular to the direction D1 and the direction D2.

Figure 2:
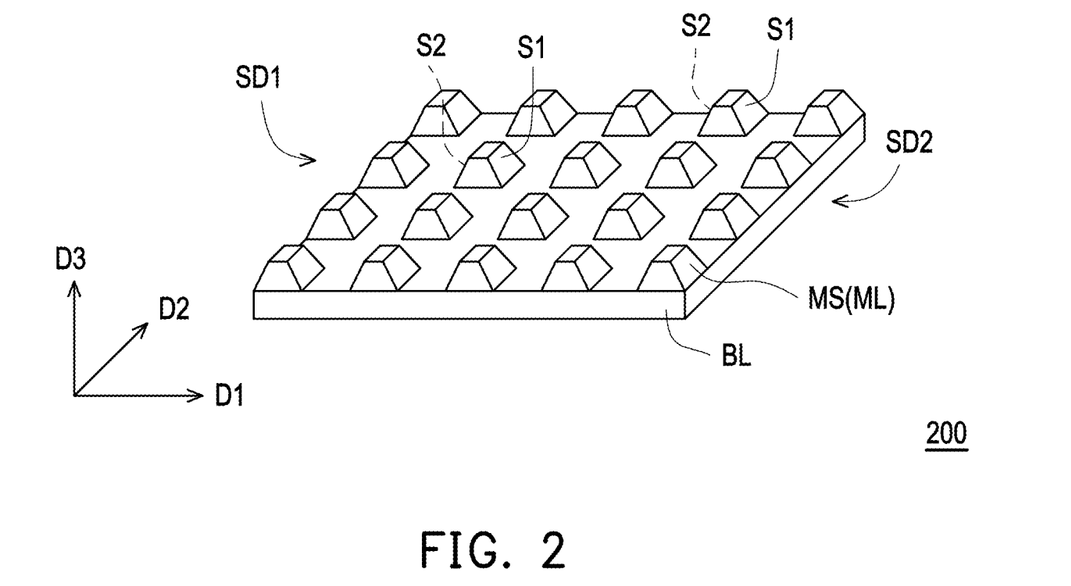
FIG. 2 is a schematic diagram of the optical film according to the second embodiment of the disclosure.

FIG. 2 is a schematic diagram of an optical film according to the second embodiment of the disclosure. Referring to FIG. 2, an optical film 200 includes a basal layer BL and a microstructure layer ML. The microstructure layer ML is disposed on a surface of the basal layer BL, and the microstructure layer ML includes multiple microstructures MS. Each of the microstructures MS includes a first surface S1 and a second surface S2 disposed opposite to each other. In this embodiment, the each of the microstructures MS is in the form of an island, and the microstructures MS are arranged from a side SD1 toward another side SD2 of the optical film 200 along a direction D1, or are arranged along a direction D2, wherein the side SD2 is opposite to the side SD1, and the direction D1 is not parallel to the direction D2. In some embodiments, the direction D1 is perpendicular to the direction D2, but the disclosure is not limited thereto. A height of the microstructure layer ML falls in a range of 5 microns to 100 microns in a direction D3, wherein the direction D3 is parallel to the normal direction of the basal layer BL, and is perpendicular to the direction D1 and the direction D2.

Figure 3A:
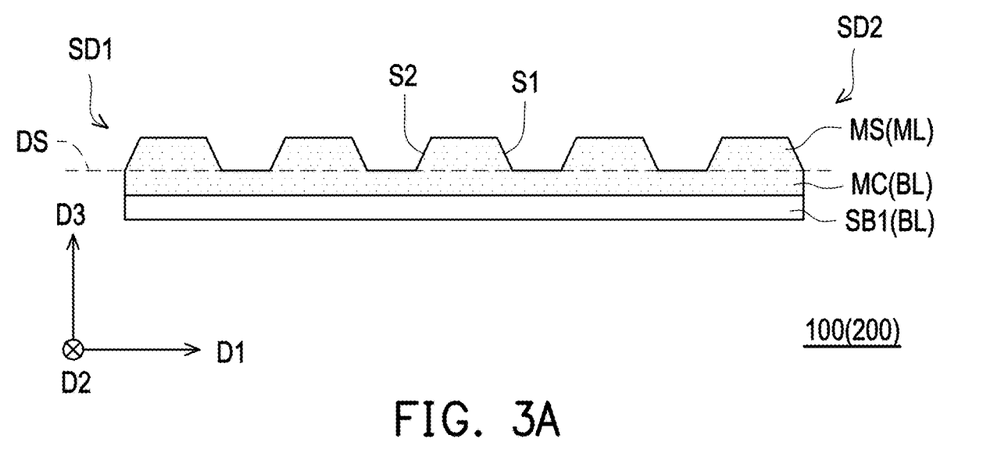
FIG. 3A is a schematic cross-sectional diagram of the optical film of FIG. 1.
Figure 3B:
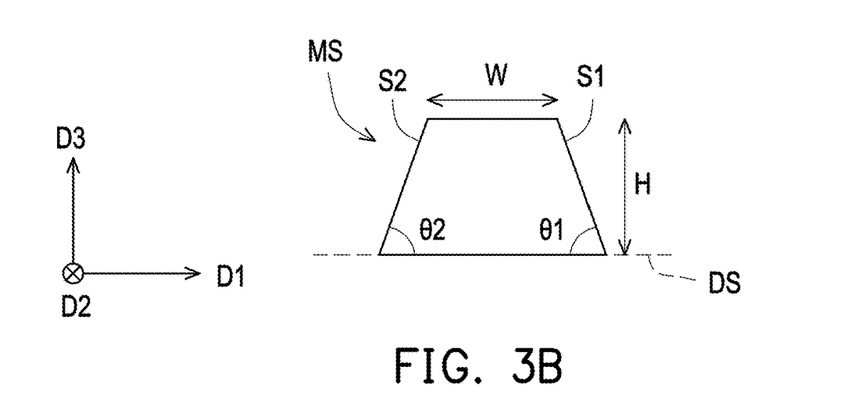
FIG. 3B is a schematic cross-sectional diagram of the microstructure of FIG. 3A.

Next, please refer to FIG. 3A and FIG. 3B. FIG. 3A is a schematic cross-sectional diagram of the optical film of FIG. 1, and FIG. 3B is a schematic cross-sectional diagram of the microstructure of FIG. 3A. Specifically, although FIG. 3A is illustrated by a cross-section of the optical film 100 of FIG. 1 in the direction D1, it is not limited thereto, and it may also be regarded as a cross-section of the optical film 200 of FIG. 2 in the direction D1.

In FIG. 3A, the basal layer BL includes a microstructure connection layer MC and a transparent base material layer SB1 disposed on a side of the microstructure connection layer MC. The microstructure connection layer MC and the microstructures MS are integrally formed and made of the same material, for example, both include photo hardening resin (UV resin).

However, the disclosure is not limited to the structure of FIG. 3A. In some embodiments, the basal layer BL only includes one of the microstructure connection layer MC and the transparent base material layer SB1. In other embodiments not shown, the optical film 100 further includes another transparent base material layer disposed on another side of the microstructure connection layer MC opposite to the side, on which the transparent base material layer SB1 is disposed.

As shown in FIG. 3A and FIG. 3B, the microstructure MS includes a first surface S1 and a second surface S2. A first angle θ1 is between the first surface S1 and a virtual datum plane DS, and a second angle θ2 is between the second surface S2 and the datum surface DS, wherein the datum surface DS is parallel to the surface of the basal layer BL. Specifically, the first angle θ1 is an first included angle between the first surface S1 and a virtual datum plane DS, the second angle θ2 is a second included angle between the second surface S2 and the datum surface DS. A vertical height H of the microstructure MS on the basal layer BL falls in a range of 5 microns to 100 microns, and a width W of a top surface of the microstructure MS away from the basal layer BL falls in a range of 10 microns to 200 microns in the direction D1. In the embodiment of the disclosure, the first angle θ1 and the second angle θ2 are greater than or equal to 40 degrees and less than or equal to 90 degrees.

Figure 3C:
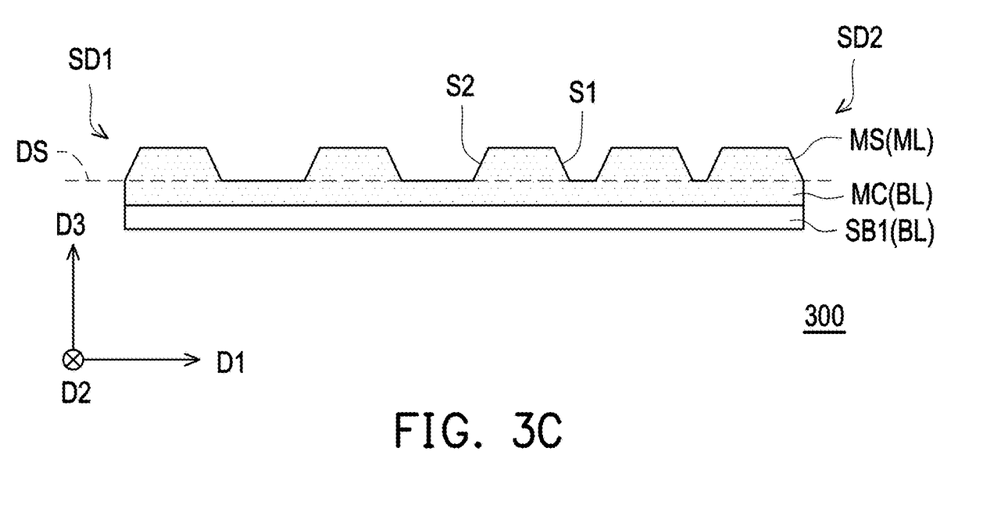
FIG. 3C is a schematic cross-sectional diagram of the optical film according to the third embodiment of the disclosure.

In FIG. 3A, the each of the microstructures MS is disposed in equal intervals in the direction D1, that is, any two microstructures adjacent to each other are disposed in intervals, but the disclosure is not limited thereto. Specifically, referring to FIG. 3C, FIG. 3C is a schematic cross-sectional diagram of an optical film according to the third embodiment of the disclosure. The number of the microstructures MS per unit area (distribution density of the microstructures MS) increases from a side SD1 of the optical film 300 toward another side SD2 opposite to the side SD1 of the optical film 300 along the direction D1, that is, the spacing between any two microstructures MS adjacent to each other becomes smaller gradually along the direction D1, that is, the microstructures MS are not disposed in equal intervals.

Figure 4:
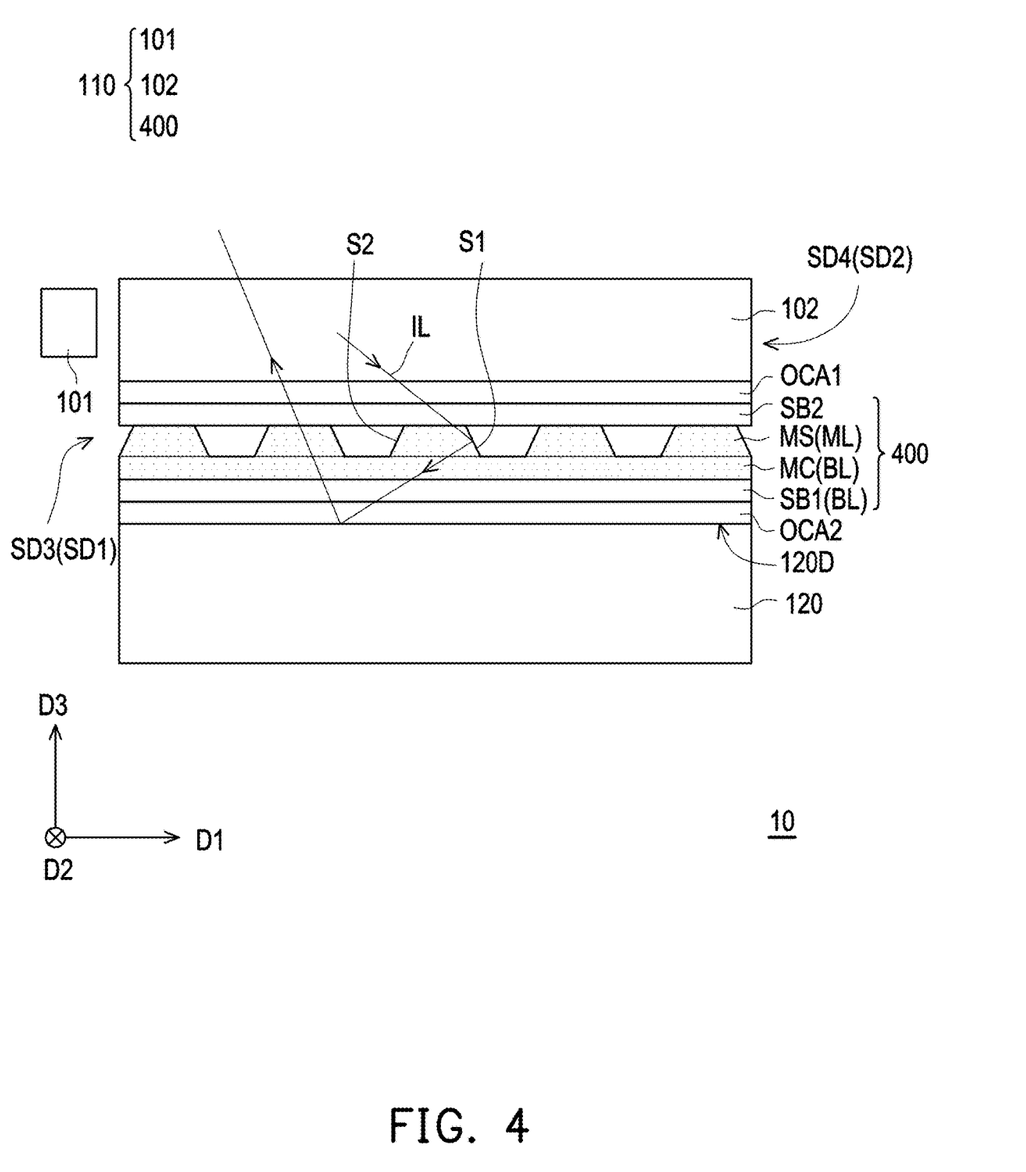
FIG. 4 is a schematic cross-sectional diagram of the display device according to an embodiment of the disclosure.

FIG. 4 is a schematic cross-sectional diagram of a display device according to an embodiment of the disclosure. Referring to FIG. 4, a display device 10 includes a display module 120 and an illuminating module 110. The display module 120 may be a display panel or a display device, and may be, for example, a reflective or transflective liquid crystal panel, an electronic paper display device, and the display module 120 has a display surface 120D for displaying images. The illuminating module 110 is disposed on the display surface 120D of the display module 120 and includes a light source 101, a light guide plate 102, and an optical film 400. The optical film 400 may be the optical film 100 or the optical film 200.

The optical film 400 is disposed between the display module 120 and the light guide plate 102, and the optical film 400 of this embodiment further includes another transparent base material layer SB2 disposed on another side of the microstructure connection layer MC opposite to the side, on which the transparent base material layer SB1 is disposed. The light guide plate 102, the optical film 400, and the display module 120 may be laminated and bonded in a full-surface manner by adhesive layers OCA1I and OCA2. The adhesive layer OCA1I is located between the light guide plate 102 and the optical film 400. The adhesive layer OCA1I covers an entire surface of a side surface of the light guide plate 102 facing the optical film 400 and an entire surface of the transparent base material layer SB2 of the optical film 400. The adhesive layer OCA2 is located between the display module 120 and the optical film 400.

As shown in FIG. 4, the light source 101 is disposed on a side SD3 of the light guide plate 102, and emits light IL toward a side SD4 opposite to the side SD3. The light guide plate 102 is used to guide the light IL. The side SD3 of the light guide plate 102 corresponds to the side SD1 of the optical film 400, and the side SD4 of the light guide plate 102 corresponds to the side SD2 of the optical film 400. The light source 101 generates the light IL. Since the refractive index of the microstructure MS is different from the refractive index of the air gap between two adjacent microstructures MS, at least a portion of the light IL may be reflected by the first surface S1 of the each of the microstructures MS and then reach the display surface 120D of the display module 120. Then, the light reflected by the display surface 120D may be reflected by the second surface S2 of each of the microstructures MS and then enter eyes of a user, or enter the eyes of the user directly without being reflected by the second surface S2 in advance, so that the image on the display surface 120D is visible.

It should be noted that, compared with some comparative examples of the conventional way, where patterns are disposed on a lower surface of the light guide plate 102 for reflecting the light IL, the microstructures MS are disposed in the optical film 400 in the embodiment of the disclosure, so that the adhesive layer OCA1I located between the light guide plate 102 and the optical film 400 may bond the light guide plate 102 and the optical film 400 in a manner of full-surface lamination, which prevents the light reflection/scattering ability of the patterns from being reduced. In this manner, the display device 10 is more reliable.

In some embodiments, the optical film 400 does not include the transparent base material layer SB1, and the microstructure connection layer MC of the optical film 400 is directly adhered to the display module 120 through the adhesive layer OCA2. In some embodiments, the optical film 400 does not include the microstructure connection layer MC, the microstructures MS are directly arranged on the transparent base material layer SB1, and the transparent base material layer SB1 is adhered to the display module 120 via the adhesive layer OCA2.

Figure 5:
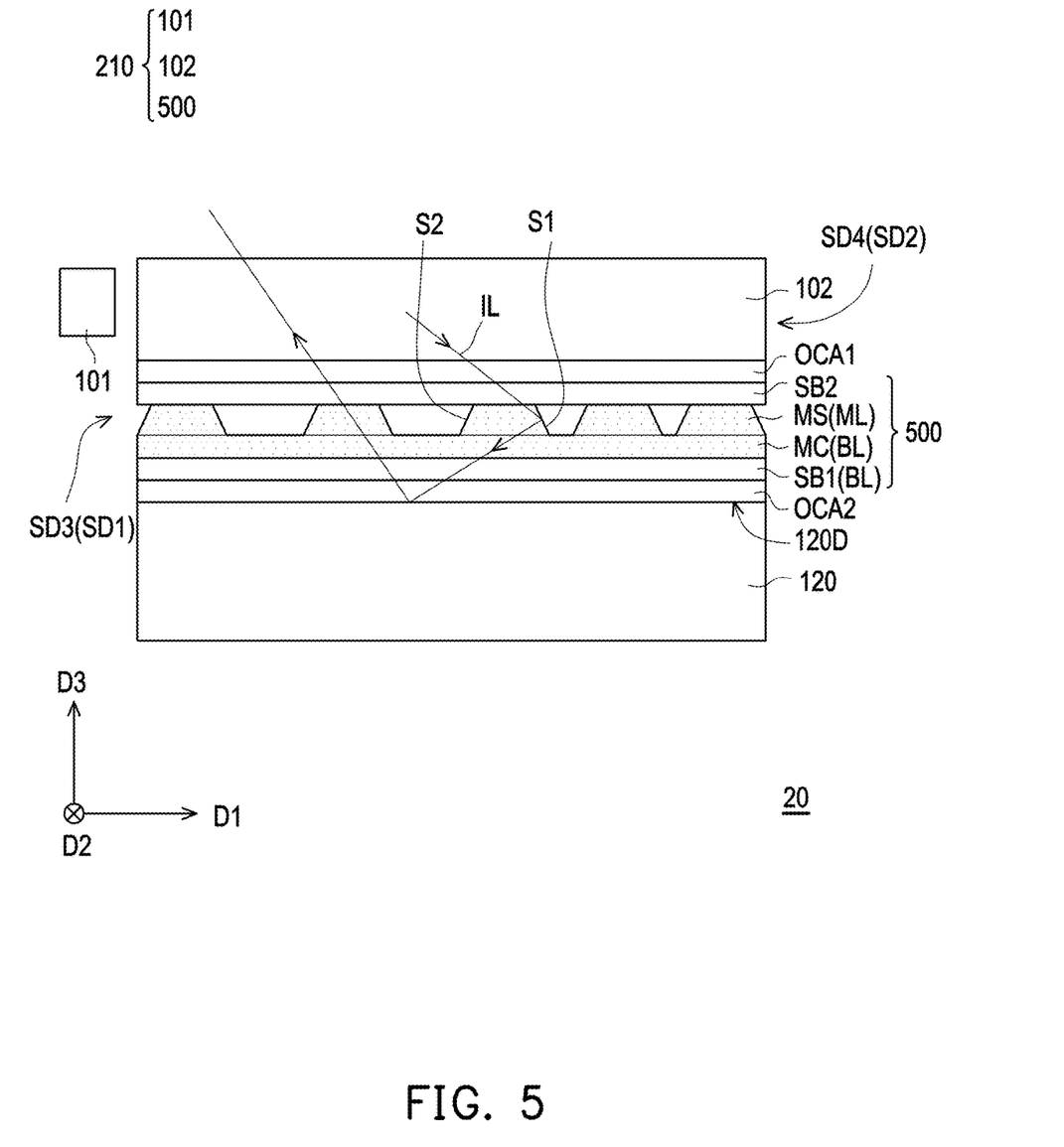
FIG. 5 is a schematic cross-sectional diagram of the display device according to another embodiment of the disclosure.

FIG. 5 is a schematic cross-sectional diagram of a display device according to another embodiment of the disclosure. Referring to FIG. 5, a display device 20 includes a display module 120 and an illuminating module 210. The display module 120 has a display surface 120D. The illuminating module 210 is disposed on the display surface 120D of the display module 120 and includes a light source 101, a light guide plate 102, and an optical film 500.

As shown in FIG. 5, the light source 101 is disposed on a side SD3 of the light guide plate 102, and emits light IL toward a side SD4 opposite to the side SD3. The side SD3 of the light guide plate 102 corresponds to a side SD1 of the optical film 500, and the side SD4 of the light guide plate 102 corresponds to a side SD2 of the optical film 500. Compared with the display device 10 in FIG. 4, the number of the microstructures MS per unit area (distribution density of the microstructures MS) in the display device 20 increases from the side SD1 toward the side SD2 of the optical film 500 along the direction D1, wherein the side SD2 is opposite to the side SD1, so that some regions on the display surface 120D that are farther away from the light source 101 may correspond to the microstructures MS that are more densely distributed, so as to guide the light IL generated from the light source 101 by the densely distributed microstructures MS. In this manner, the regions that are farther away from the light source 101 may emit more light IL from the light guide plate 102 to increase the brightness of the light emitted from the regions, and raise luminance uniformity of the display device 20.

Figure 6:
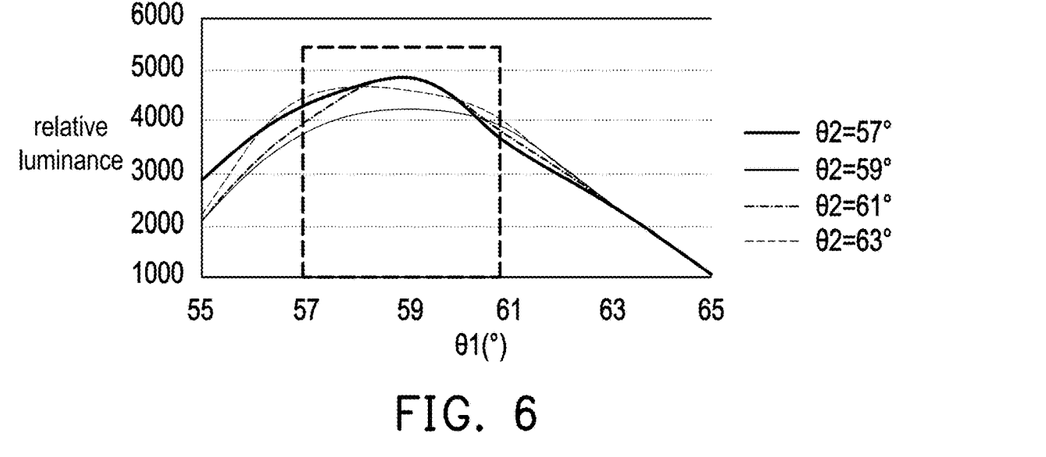
FIG. 6, FIG. 7, and FIG. 8 are schematic diagrams of luminance of the display device according to an embodiment of the disclosure.
Figure 7:
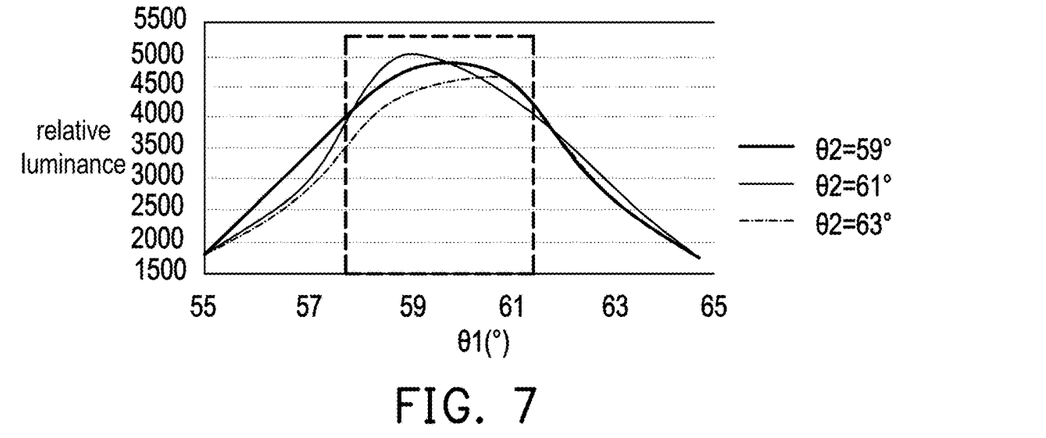
Figure 8:
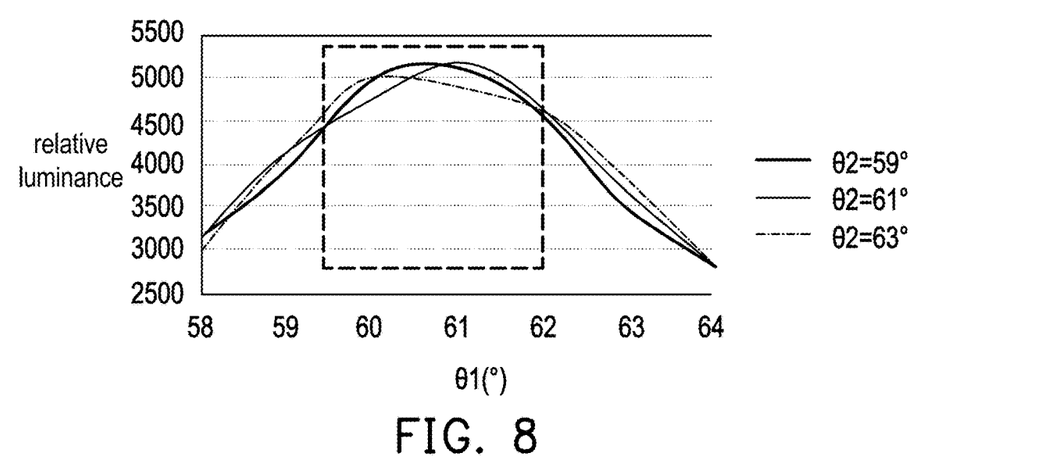

FIG. 6, FIG. 7, and FIG. 8 illustrate schematic diagrams of relative luminance of the display device in the above embodiments when the refractive index of the microstructure layer ML is 1.55, 1.58 and 1.61, respectively. The relative luminance refers to the relative luminance of the display device from the front view angle.

It can be seen that for the microstructure layers ML having different refractive indexes, when the first angle θ1 between the first surface S1 and the datum plane DS is substantially equal to the second angle θ2 between the second surface S2 and the datum plane DS, the display device may have good luminance performance. In some embodiments, when the first angle θ1 and the second angle θ2 are greater than or equal to S5 degrees and less than or equal to 65 degrees, the display device may have better luminance performance. In some embodiments, when the first angle θ1 and the second angle θ2 are greater than or equal to 57 degrees and less than or equal to 63 degrees, the display device may have much better luminance performance.

Figure 9:
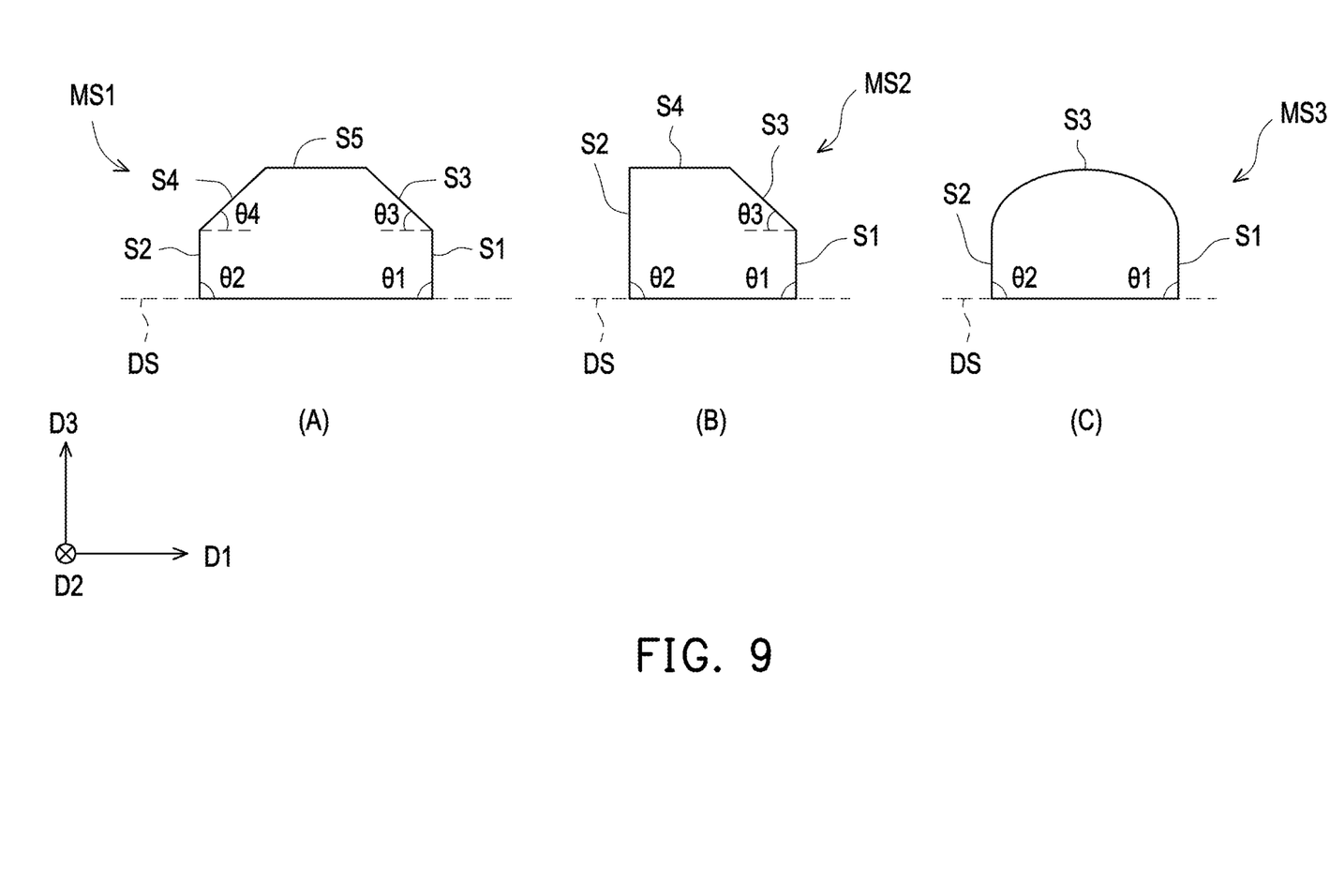
FIG. 9 is a schematic cross-sectional diagram of the microstructure according to an embodiment of the disclosure.

FIG. 9 is a schematic cross-sectional diagram of a microstructure according to an embodiment of the disclosure.

In part (A) of FIG. 9, according to an embodiment of the disclosure, a first angle θ1 is between a first surface S1 of a microstructure MS1 and a datum plane DS, and a second angle θ2 is between a second surface S2 of the microstructure MS1 and the datum surface DS, where the first angle θ1 is 90 degrees, and the second angle θ2 is 90 degrees. The microstructure MS1 further includes a third surface S3, a fourth surface S4, and a fifth surface S5. The third surface S3 is located between the first surface S1 and the fifth surface S5, and two ends of the third surface S3 are connected to the first surface S1 and the fifth surface S5 respectively, wherein an included angle θ3 between the third surface S3 and the datum surface DS is greater than or equal to 40 degrees and less than or equal to 90 degrees. The fourth surface S4 is located between the second surface S2 and the fifth surface S5, and two ends of the fourth surface S4 are connected to the second surface S2 and the fifth surface S5 respectively, wherein an included angle θ4 between the fourth surface S4 and the datum surface DS is greater than or equal to 40 degrees and less than or equal to 90 degrees. In this embodiment, the fifth surface S5 is a plane and parallel to the datum surface DS.

In part (B) of FIG. 9, according to an embodiment of the disclosure, a first angle θ1 is between a first surface S1 of a microstructure MS2 and a datum plane DS, and a second angle θ2 is between a second surface S2 of the microstructure MS2 and the datum surface DS, wherein the first angle θ1 is 90 degrees, and the second angle θ2 is 90 degrees. The microstructure MS2 further includes a third surface S3 and a fourth surface S4. Two ends of the third surface S3 are connected to the first surface S1 and the fourth surface S4 respectively, and the other end of the fourth surface S4 is connected to the second surface S2, where an included angle θ3 between the third surface S3 and the datum surface DS is greater than or equal to 40 degrees and less than or equal to 90 degrees. In this embodiment, the fourth surface S4 is a plane and parallel to the datum surface DS.

In part (C) of FIG. 9, according to an embodiment of the disclosure, a first angle θ1 is between a first surface S1 of a microstructure MS3 and a datum plane DS, and a second angle θ2 is between a second surface S2 of the microstructure MS3 and the datum surface DS, wherein the first angle θ1 is 90 degrees, and the second angle θ2 is 90 degrees. The microstructure MS3 further includes a third surface S3. The third surface S3 is a curved surface connected between the first surface S1 and the second surface S2.

To sum up, the optical film provided by the embodiment of the disclosure has microstructures. Each of the microstructures has the first surface and the second surface. The first angle is between the first surface and the datum plane, and the second angle is between the second surface and the datum plane. When the display surface of the display module of the display device is parallel to the datum plane, and the illuminating module of the display device is equipped with the light source on the side of the light guide plate, at least a portion of light emitted from the light source is firstly reflected by the first surface and/or the second surface and reach the display surface of the display module, and then is reflected by the display surface and enter into eyes of a user, so as to make a display image of the display device visible. Compare with the conventional way, wherein patterns are disposed on a lower surface of the light guide plate of the illuminating module for reflecting light. According to the embodiments of the disclosure, the microstructures are disposed in the optical film, and the light guide plate, the optical film, and the display module may be laminated in a full-surface manner, so that the display device may have high structural reliability under front light illumination.

The foregoing description of the preferred embodiments of the disclosure has been presented for purposes of illustration and description. It is not intended to be exhaustive or to limit the disclosure to the precise form or to exemplary embodiments disclosed. Accordingly, the forward description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred example embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should 5 not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the 10 claims. Any advantages and benefits described may not apply to all embodiments of the disclosure. It should be appreciated that variations may be made in the embodiments described by persons skilled in the art without departing from the scope of the disclosure as defined by the Moreover, no element and component in the disclosure is intended to be dedicated to the public regardless of whether the element or component is explicitly recited in the following claims.

What is claimed is:

1. An optical film comprising:
a basal layer; and
a microstructure layer disposed on a surface of the basal layer, and the microstructure layer comprises a plurality of microstructures, wherein each of the plurality of microstructures comprises a first surface and a second surface disposed opposite to each other,
wherein a first angle is between the first surface and a datum plane, a second angle is between the second surface and the datum plane, the datum plane is parallel to the surface of the basal layer, and the first angle and the second angle are greater than or equal to 40 degrees and less than or equal to 90 degrees, wherein the basal layer includes a microstructure connection layer and a transparent base material layer, and the microstructure connection layer and the microstructures are integrally formed and made of the same material.

2. The optical film according to claim 1, wherein an angle of the first angle is equal to an angle of the second angle.

3. The optical film according to claim 1, wherein angles of the first angle and the second angle are greater than or equal to 55 degrees and less than or equal to 65 degrees.

4. The optical film according to claim 1, wherein angles of the first angle and the second angle are greater than or equal to 57 degrees and less than or equal to 63 degrees.

5. The optical film according to claim 1, wherein distribution density of the plurality of microstructures increases from a side toward another side opposite to the side of the optical film.

6. The optical film according to claim 1, wherein any two adjacent microstructures among the plurality of microstructures are disposed in intervals.

7. The optical film according to claim 1, wherein a material of the microstructure layer comprises photo hardening resin.

8. A display device comprising:
a display module having a display surface; and
an illuminating module disposed on the display surface of the display module, and comprising:
a light source;
a light guide plate, wherein the light source is disposed on a first side of the light guide plate; and
an optical film disposed between the display module and the light guide plate, and the optical film comprising:
a basal layer; and
a microstructure layer disposed between a surface of the basal layer and the light guide plate, and comprising a plurality of microstructures, wherein each of the plurality of microstructures comprises a first surface and a second surface disposed opposite to each other,
wherein a first angle is between the first surface and a datum plane, a second angle is between the second surface and the datum plane, the datum plane is parallel to the surface of the basal layer, and the first angle and the second angle are greater than or equal to 40 degrees and less than or equal to 90 degrees,
wherein the basal layer includes a microstructure connection layer and a transparent base material layer, and the microstructure connection layer and the microstructures are integrally formed and made of the same material.

9. The display device according to claim 8, wherein distribution density of the microstructures increases from the first side toward a second side, the second side being opposite to the first side.

10. The display device according to claim 8, wherein an angle of the first angle is equal to an angle of the second angle.

11. The display device according to claim 8, wherein angles of the first angle and the second angle are greater than or equal to 55 degrees and less than or equal to 65 degrees.

12. The display device according to claim 8, wherein angles of the first angle and the second angle are greater than or equal to 57 degrees and less than or equal to 63 degrees.

13. The display device according to claim 8, wherein the illuminating module further comprises a first adhesive layer located between the light guide plate and the optical film, and the first adhesive layer covers an entire surface of a side surface of the light guide plate facing the optical film.

14. The display device according to claim 13, wherein the display device further comprises a second adhesive layer, the second adhesive layer being located between the display module and the optical film.

* * * * *